United States Patent
Xu et al.

(10) Patent No.: US 9,787,536 B2
(45) Date of Patent: Oct. 10, 2017

(54) METHOD AND APPARATUS FOR CONFIGURING PACKET FORWARDING MANNER

(71) Applicant: Huawei Technologies Co., Ltd., Shenzhen (CN)

(72) Inventors: Yibin Xu, Nanjing (CN); Bing Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/712,235

(22) Filed: May 14, 2015

(65) Prior Publication Data
US 2015/0333958 A1 Nov. 19, 2015

(30) Foreign Application Priority Data
May 16, 2014 (CN) .......................... 2014 1 0209896

(51) Int. Cl.
| | |
|---|---|
| H04L 12/24 | (2006.01) |
| H04L 12/741 | (2013.01) |
| H04L 29/06 | (2006.01) |
| H04L 12/06 | (2006.01) |
| H04L 12/08 | (2006.01) |
| H04W 12/06 | (2009.01) |
| H04W 12/08 | (2009.01) |

(52) U.S. Cl.
CPC ...... *H04L 41/0803* (2013.01); *H04L 41/0806* (2013.01); *H04L 41/0893* (2013.01); *H04L 45/74* (2013.01); *H04L 63/20* (2013.01); *H04W 12/06* (2013.01); *H04W 12/08* (2013.01); *H04L 41/0816* (2013.01)

(58) Field of Classification Search
CPC ..... H04W 28/0226; H04W 36/0005–36/0022; H04W 36/10; H04W 40/34–40/36; H04L 41/0803; H04L 45/74
See application file for complete search history.

(56) References Cited

U.S. PATENT DOCUMENTS

| | | | | |
|---|---|---|---|---|
| 2007/0153741 | A1* | 7/2007 | Blanchette | H04L 45/66 370/331 |
| 2009/0086689 | A1* | 4/2009 | Hunt | H04W 28/06 370/338 |
| 2011/0314517 | A1* | 12/2011 | Yamato | H04L 9/32 726/3 |
| 2013/0059530 | A1* | 3/2013 | Xu | H04L 41/0803 455/39 |

FOREIGN PATENT DOCUMENTS

EP  2568675 A1  3/2013

OTHER PUBLICATIONS

Foreign Communication From a Counterpart Application, European Application No. 15165287.2, Extended European Search Report dated Oct. 22, 2015, 7 pages.

* cited by examiner

*Primary Examiner* — Eric Myers
(74) *Attorney, Agent, or Firm* — Quarles & Brady LLP

(57) ABSTRACT

A method and an apparatus for configuring a packet forwarding manner. The method includes receiving, by a control node (CN), a connection establishment request packet from a client device, and acquiring a user attribute according to the request packet; according to the user attribute and a forwarding policy, acquiring, by the first CN, a packet forwarding manner corresponding to the client device, where the forwarding policy includes a packet forwarding manner corresponding to the user attribute; and after authentication succeeds, sending, by the first CN, a message carrying the acquired packet forwarding manner to a wireless access point (AP) associated with the client device, so as to instruct the wireless AP to create a forwarding entry of the client device, where the forwarding entry includes the packet forwarding manner. The present invention implements user-based control of a packet forwarding manner, simplifying configuration and maintenance.

7 Claims, 2 Drawing Sheets

METHOD AND APPARATUS FOR CONFIGURING PACKET FORWARDING MANNER

CROSS-REFERENCE TO RELATED APPLICATION

This application claims priority to Chinese Patent Application No. 201410209896.4, filed on May 16, 2014, which is hereby incorporated by reference in its entirety.

TECHNICAL FIELD

This application relates to wireless local area networks, and in particular, to a method and an apparatus for configuring a packet forwarding manner.

BACKGROUND

In a wireless local area network (WLAN) architecture in which there is a tunnel between a control node (CN) and a wireless access point (AP), a forwarding manner of a user data packet may be a tunnel forwarding manner or a local forwarding manner. The CN is a node for user authentication and is generally a WLAN controller, or a switch into which a function of a WLAN controller is integrated. The CN is responsible for user authentication and may be configured to manage a wireless AP, and the CN also has functions of data forwarding and forwarding policy implementation, where a forwarding policy includes a local forwarding manner and a tunnel forwarding manner. The wireless AP includes a wireless station (STA) function and provides access to a distribution service via a wireless medium (WM) for an associated STA. The wireless AP can implement the functions of data forwarding and forwarding policy implementation. In the following, a STA associated with a wireless AP is referred to as a client device. A client device is a terminal, for example, a personal computer or a mobile terminal, used by a user.

In the WLAN architecture in which there is a tunnel between a CN and a wireless AP, the packet forwarding manner may be controlled based on a user type. For example, the local forwarding manner is used for a packet belonging to a trusted user, and the tunnel forwarding manner is used for a packet not belonging to a trusted user. The local forwarding manner is a packet forwarding manner in which a wireless AP converts a WLAN packet to an Ethernet packet to perform forwarding; the tunnel forwarding manner is a packet forwarding manner in which a wireless AP converts a WLAN packet to an Ethernet packet and then encapsulates the Ethernet packet in a tunnel and forwards the packet to a CN, and the CN performs forwarding after performing tunnel decapsulation. In order to control the packet forwarding manner based on a user type, a service set identifier (SSID) generally needs to be set based on the user type. For example, one SSID is set for a trusted user, another SSID is set for another user, and corresponding forwarding manners are configured for the two SSIDs. The foregoing solution is complex in configuration and maintenance.

SUMMARY

The embodiment of the present invention provides a method and an apparatus for configuring a packet forwarding manner, which implement user-based control of a packet forwarding manner, so that configuration and maintenance are easy.

According to a first aspect, an embodiment of the present invention provides a method for configuring a packet forwarding manner, where the method includes receiving, by a first CN, a connection establishment request packet from a client device, and acquiring a user attribute according to the request packet; according to the user attribute and a forwarding policy that is stored in the first CN or an authentication controller, acquiring, by the first CN, a packet forwarding manner corresponding to the client device, where the forwarding policy includes a packet forwarding manner corresponding to the user attribute; and after authentication succeeds, sending, by the first CN, a message carrying the acquired packet forwarding manner to a wireless AP associated with the client device, so as to instruct the wireless AP to create a forwarding entry of the client device, where the forwarding entry includes the packet forwarding manner.

According to the first aspect, in a first possible implementation manner of the first aspect, the first CN further sends an address that is of the client device and corresponding to the packet forwarding manner to the wireless AP associated with the client device; and the forwarding entry further includes the address of the client device.

According to the first aspect or the first possible implementation manner of the first aspect, in a second possible implementation manner of the first aspect, when the packet forwarding manner is a local forwarding manner, the method further includes sending the address of the client device to the wireless AP associated with the client device; and when the packet forwarding manner is a centralized forwarding manner, the method further includes sending a tunnel encapsulation and decapsulation parameter related to the client device to the wireless AP associated with the client device.

According to any one of the first aspect and the first and second possible implementation manners of the first aspect, in a third possible implementation manner of the first aspect, when the client device roams from a first wireless AP of a second CN to a second wireless AP of the first CN, the first CN determines a second packet forwarding manner for a packet of the client device according to a first packet forwarding manner for the packet of the client device and a roaming policy, where the first packet forwarding manner is a forwarding manner used by the first wireless AP for the packet of the client device, and the second packet forwarding manner is a forwarding manner used by the second wireless AP for the packet of the client device; and the first CN sends the second packet forwarding manner to the second wireless AP to which the client device roams, so that the second wireless AP to which the client device roams creates a forwarding entry of the client device.

According to the third possible implementation manner of the first aspect, in a fourth possible implementation manner of the first aspect, before the determining a second packet forwarding manner for a packet of the client device, the method further includes pre-configuring the roaming policy, where the roaming policy is a policy used to determine a change of the packet forwarding manner when the client device roams between different wireless APs.

According to a second aspect, an embodiment of the present invention provides an apparatus for configuring a packet forwarding manner, where the apparatus includes a receiving unit configured to receive a connection establishment request packet from a client device, and acquire a user attribute according to the request packet; an acquiring unit configured to acquire, according to the user attribute and a forwarding policy that is stored in the apparatus or an authentication controller, a packet forwarding manner corresponding to the client device, where the forwarding policy includes a packet forwarding manner corresponding to the user attribute; and a sending unit configured to send, after authentication succeeds, a message carrying the acquired packet forwarding manner to a wireless AP associated with the client device, so as to instruct the wireless AP to create a forwarding entry of the client device, where the forwarding entry includes the packet forwarding manner.

According to the second aspect, in a first possible implementation manner, the sending unit is further configured to send an address that is of the client device and corresponding to the packet forwarding manner to the wireless AP associated with the client device; and the forwarding entry further includes an address of the client device.

According to the second aspect or the first possible implementation manner of the second aspect, in a second possible implementation manner of the second aspect, when the packet forwarding manner is a local forwarding manner, the sending unit is further configured to send the address of the client device to the wireless AP associated with the client device; and when the packet forwarding manner is a centralized forwarding manner, the sending unit is further configured to send a tunnel encapsulation and decapsulation parameter related to the client device to the wireless AP associated with the client device.

According to any one of the second aspect and the first and second possible implementation manners of the second aspect, in a third possible implementation manner of the second aspect, the apparatus further includes a determining unit; when the client device roams from a first wireless AP of a second CN to a second wireless AP of a first CN, the determining unit is configured to determine a second packet forwarding manner for a packet of the client device according to a first packet forwarding manner for the packet of the client device and a roaming policy, where the first packet forwarding manner is a forwarding manner used by the first wireless AP for the packet of the client device, and the second packet forwarding manner is a forwarding manner used by the second wireless AP for the packet of the client device; and the sending unit is further configured to send the second packet forwarding manner to the second wireless AP to which the client device roams, so that the second wireless AP to which the client device roams creates a forwarding entry of the client device.

According to the third possible implementation manner of the second aspect, in a fourth possible implementation manner of the second aspect, the apparatus further includes a storing unit configured to store the pre-configured roaming policy, where the roaming policy is a policy used to determine a change of the packet forwarding manner when the client device roams between different wireless APs.

According to the method and apparatus for configuring a packet forwarding manner provided in the embodiments of the present invention, a CN receives a connection establishment request packet from a client device, and acquires a user attribute according to the request packet; according to the user attribute and a forwarding policy that is stored in a first CN or an authentication controller, the first CN acquires a packet forwarding manner corresponding to the client device, where the forwarding policy includes a packet forwarding manner corresponding to the user attribute; after authentication succeeds, the first CN sends a message carrying the acquired packet forwarding manner to a wireless AP associated with the client device, so as to instruct the wireless AP to create a forwarding entry of the client device, where the forwarding entry includes the packet forwarding manner, thereby implementing user-based control of a packet forwarding manner and simplifying network management and maintenance, so that configuration and maintenance are easy.

DESCRIPTION OF EMBODIMENTS

For better understanding of the present invention, the present invention is further described with reference to the accompanying drawings and specific embodiments; however, the embodiments are not intended to limit the protection scope of the present invention.

Figure 1:
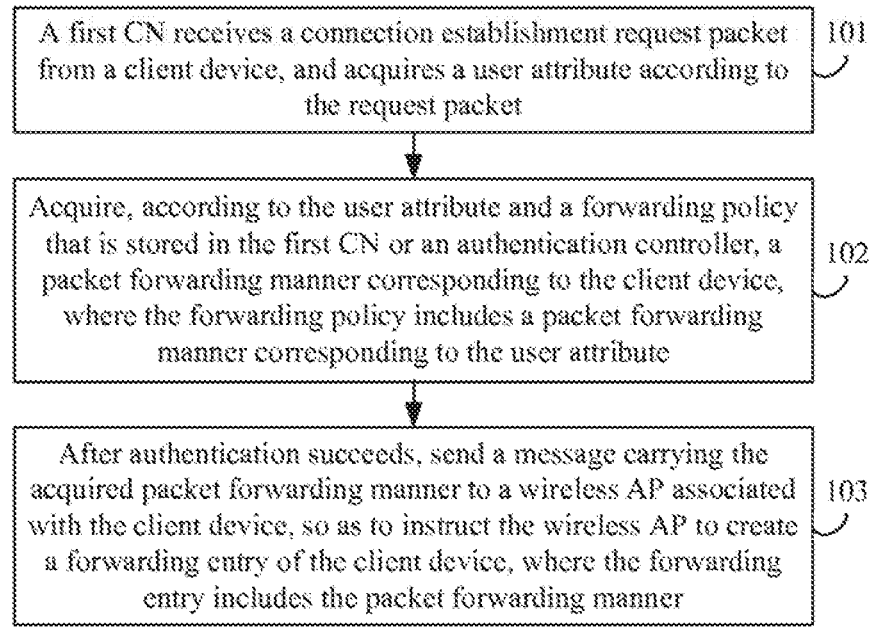
FIG. 1 is a flowchart of a method for configuring a packet forwarding manner according to an embodiment of the present invention.

FIG. 1 is a flowchart of a method for configuring a packet forwarding manner according to an embodiment of the present invention, where a method for controlling a packet forwarding manner of a user using a user attribute (for example, a user account, a client device type, or an address of a client device) is described in detail. As shown in FIG. 1, this embodiment includes the following steps.

Step 101: A CN receives a connection establishment request packet from a client device, and acquires a user attribute according to the request packet.

For example, according to the Institute of Electrical and Electronics Engineers (IEEE) 802.1x protocol, when a user needs to access the Internet, the user may input a user account and password, which are already registered, on a client device (the client device acts as a supplicant defined in the 802.1x protocol) to initiate a connection request. In this case, the client device sends a connection establishment request packet to a CN (the CN acts as an authenticator defined in the 802.1x protocol), and the CN performs authentication on the user to determine whether the user authentication succeeds. For example, after receiving the connection establishment request packet, the CN may directly perform the authentication (the CN acts as an authentication server defined in the 802.1x protocol). For another example, the CN may also initiate an authentication request to an authentication controller (the authentication controller acts as an authentication server defined in the 802.1x protocol) to determine whether the user authentication succeeds.

The user attribute includes one or more of the following items: a user account, a client device type, and an address of the client device.

The connection establishment request packet sent by the client device to the CN carries the user account. The request packet may further include the address of the client device, such as a media access control (MAC) address or an Internet Protocol (IP) address. The address of the client device may be in a header of the request packet. If a forwarding policy includes a correspondence between a packet forwarding manner and the address of the client device, the address of the client device may be considered as a user attribute. The CN may analyze the request packet, or analyze another packet from the client device according to the request packet, so as to obtain the client device type.

Step 102: The CN acquires, according to the user attribute and a forwarding policy that is stored in the CN or an authentication controller, a packet forwarding manner corresponding to the client device, where the forwarding policy includes a packet forwarding manner corresponding to the user attribute.

The forwarding policy is pre-configured in the CN or the authentication controller, where the forwarding policy includes the user attribute and the packet forwarding manner corresponding to the user attribute.

The authentication controller is an authentication, authorization and accounting (AAA) server.

After receiving the connection establishment request packet from the client device, the CN acquires the packet forwarding manner. The CN may acquire the packet forwarding manner corresponding to the client device from the forwarding policy configured in the CN. If the CN performs authentication on the user using the authentication controller, the authentication controller may add the packet forwarding manner in an authentication response message sent to the CN, and the CN acquires, from the authentication controller, the packet forwarding manner corresponding to the client device.

Step 103: After authentication succeeds, the CN sends a message carrying the acquired packet forwarding manner to a wireless AP associated with the client device, so as to instruct the wireless AP to create a forwarding entry of the client device, where the forwarding entry includes the packet forwarding manner.

The forwarding entry created by the wireless AP includes the address of the client device and the packet forwarding manner corresponding to the address of the client device.

When the user authentication performed by the CN succeeds, the CN may send the message carrying the packet forwarding manner to the wireless AP associated with the client device.

Optionally, when the packet forwarding manner is a local forwarding manner, the message carrying the packet forwarding manner and sent by the CN may further carry the address of the client device. When the packet forwarding manner is a centralized forwarding manner, the sent message carrying the packet forwarding manner may further carry a tunnel encapsulation and decapsulation parameter related to the client device, and may further carry the address of the client device. The tunnel encapsulation and decapsulation parameter related to the client device is generated by the CN. If the user attribute includes the address of the client device, or the wireless AP records a correspondence between the user attribute and the address of the client device after receiving the connection establishment request packet, the message carrying the packet forwarding manner and sent by the CN may not include the address of the client device.

After receiving the message carrying the packet forwarding manner, the wireless AP may create the forwarding entry of the client device, where the forwarding entry of the client device includes the packet forwarding manner of the client device, and also includes the address of the client device, so that after receiving a packet from the client device, the wireless AP can look up, according to the address in the packet, the forwarding entry that is of the client device and corresponding to the address of the client device, and acquire the packet forwarding manner corresponding to the address of the client device.

When receiving the connection establishment request packet from the client device, the wireless AP may determine the correspondence between the address of the client device and the user attribute according to the address in the request packet and the user attribute carried by the request packet. However, a common service packet may possibly include only the address of the client device but not the user account or the client device type, and therefore the address of the client device and the packet forwarding manner are included in the forwarding entry created in the wireless AP, so that the wireless AP forwards a received service packet correspondingly.

This embodiment of the present invention implements a solution in which forwarding manners of different user types are controlled based on user attributes, so that it is easy to configure and maintain a CN.

The foregoing embodiment describes the method for configuring a packet forwarding manner, and after the packet forwarding manner is configured, if the client device roams from one wireless AP to another wireless AP, this embodiment of the present invention can keep use of the original packet forwarding manner after roaming of the client device. The client device may roam between different wireless APs within one CN, or may roam between wireless APs in coverage of different CNs.

Figure 2:
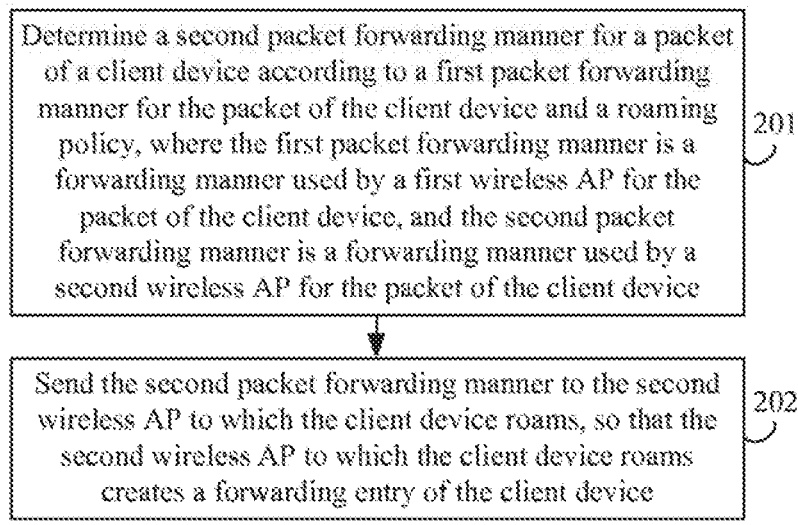
FIG. 2 is a flowchart of another method for configuring a packet forwarding manner according to an embodiment of the present invention.

FIG. 2 is a flowchart of another method for configuring a packet forwarding manner according to an embodiment of the present invention. A scenario to which this embodiment is applied is a scenario in which a client device roams from a first wireless AP of a second CN to a second wireless AP of a first CN, where if the first CN and the second CN are a same CN, it indicates that the client device roams between different wireless APs within one CN, and if the first CN and the second CN are different CNs, it indicates that the client device roams between wireless APs in coverage of different CNs. As shown in FIG. 2, this embodiment includes the following steps.

Step 201: The first CN determines a second packet forwarding manner for a packet of the client device according to a first packet forwarding manner of the client device and a roaming policy, where the first packet forwarding manner is a forwarding manner used by the first wireless AP for the packet of the client device, and the second packet forwarding manner is a forwarding manner used by the second wireless AP for the packet of the client device.

The roaming policy may be pre-configured in a CN. The roaming policy is a policy used to determine a change of a packet forwarding manner when the client device roams between different wireless APs.

The roaming policy mentioned herein is not unchangeable and may be determined by each CN according to limitations imposed on some user attributes by the CN. For example, if a CN does not support use of a local forwarding manner for packets of some client device types (for example, smart phones), a roaming policy of the CN may be that, if a client device type of a client device roaming to the CN is intelligent terminal, a packet forwarding manner of the client device roaming to the CN can only be a centralized forwarding manner no matter whether a first packet forwarding manner is a local forwarding manner or a centralized forwarding manner; according to the roaming policy, if the client device type of the client device roaming to the CN is not intelligent terminal, a second packet forwarding manner for a packet of the client device roaming to the CN may be the same as the first packet forwarding manner before the roaming.

Step 202: The first CN sends the second packet forwarding manner to the second wireless AP to which the client device roams, so that the second wireless AP to which the client device roams creates a forwarding entry of the client device.

After determining the second packet forwarding manner for the packet of the client device roaming to the second wireless AP, the first CN sends a message carrying the second packet forwarding manner to the wireless AP to which the client device roams. When the second packet forwarding manner is a local forwarding manner, the sent message carrying the packet forwarding manner may further include an address of the client device. If the second packet forwarding manner is a centralized forwarding manner, the message may further include the address of the client device and a tunnel encapsulation and decapsulation parameter related to the client device.

After receiving the message carrying the packet forwarding manner, the wireless AP may create the forwarding entry of the client device, where the forwarding entry of the client device includes the packet forwarding manner of the client device, and also includes the address of the client device, so that after receiving a packet from the client device, the wireless AP can look up, according to a user attribute of the client device, the forwarding entry that is of the client device and corresponding to the address of the client device, and acquire the packet forwarding manner corresponding to the address of the client device.

Therefore, according to this embodiment of the present invention, a packet forwarding manner of a client device is controlled based on a user attribute, and the forwarding manner can roam synchronously when the client device roams between different wireless APs.

Figure 3:
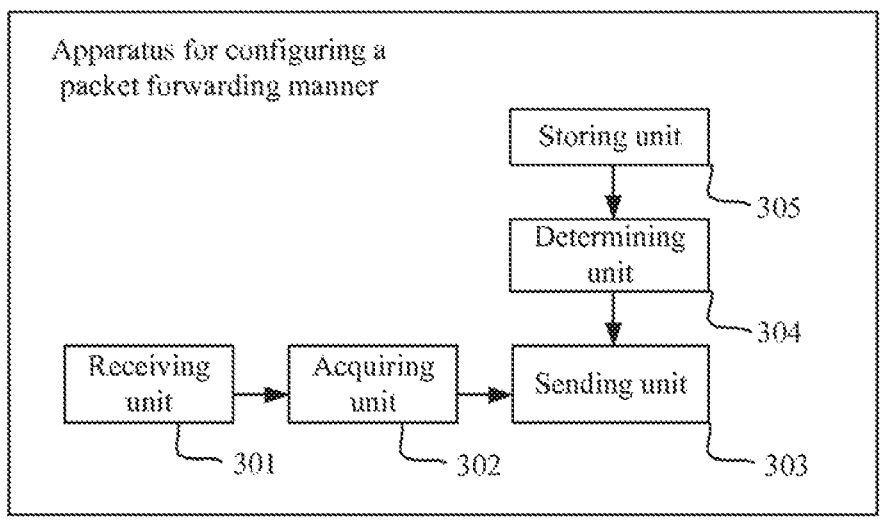
FIG. 3 is a schematic diagram of an apparatus for configuring a packet forwarding manner according to an embodiment of the present invention.

Correspondingly, an embodiment of the present invention further provides an apparatus for configuring a packet forwarding manner, and FIG. 3 is a schematic diagram of the apparatus for configuring a packet forwarding manner according to this embodiment of the present invention, where the apparatus is located in a first CN. As shown in FIG. 3, this embodiment includes a receiving unit 301, an acquiring unit 302, and a sending unit 303.

The receiving unit 301 is configured to receive a connection establishment request packet from a client device, and acquire a user attribute according to the request packet.

For example, according to the 802.1x protocol, when a user needs to access the Internet, the user may input a user account and password, which are already registered, on a client device (the client device acts as a supplicant defined in the 802.1x protocol) to initiate a connection request. In this case, the client device sends a connection establishment request packet to a CN (the CN acts as an authenticator defined in the 802.1x protocol), and the CN performs authentication on the user to determine whether the user authentication succeeds. For example, after receiving the connection establishment request packet, the CN may directly perform the authentication (the CN acts as an authentication server defined in the 802.1x protocol). For another example, the CN may also initiate an authentication request to an authentication controller (the authentication controller acts as an authentication server defined in the 802.1x protocol) to determine whether the user authentication succeeds.

The user attribute includes one or more of the following items: a user account, a client device type, and an address of the client device.

The connection establishment request packet sent by the client device to the CN carries the user account. The request packet may further include the address of the client device, such as a MAC address or an IP address. The address of the client device may be in a header of the request packet. If a forwarding policy includes a correspondence between a packet forwarding manner and the address of the client device, the address of the client device may be considered as a user attribute. The CN may analyze the request packet, or analyze another packet from the client device according to the request packet, so as to obtain the client device type.

The acquiring unit 302 is configured to acquire, according to the user attribute and a forwarding policy that is stored in the apparatus or an authentication controller, a packet forwarding manner corresponding to the client device, where the forwarding policy includes a packet forwarding manner corresponding to the user attribute.

The forwarding policy is pre-configured in the CN or the authentication controller, where the forwarding policy includes the user attribute and the packet forwarding manner corresponding to the user attribute.

After receiving the connection establishment request packet from the client device, the CN acquires the packet forwarding manner. The CN may acquire the packet forwarding manner corresponding to the client device from the forwarding policy configured in the CN. If the CN performs authentication on the user using the authentication controller, the authentication controller may add the packet forwarding manner in an authentication response message sent to the CN, and the CN acquires, from the authentication controller, the packet forwarding manner corresponding to the client device.

The sending unit 303 is configured to send, after authentication succeeds, a message carrying the acquired packet forwarding manner to a wireless AP associated with the client device, so as to instruct the wireless AP to create a forwarding entry of the client device, where the forwarding entry includes the packet forwarding manner.

The sending unit 303 is further configured to send an address that is of the client device and corresponding to the packet forwarding manner to the wireless AP associated with the client device; the forwarding entry further includes the address of the client device.

The forwarding entry created by the wireless AP includes the address of the client device and the packet forwarding manner corresponding to the address of the client device.

When the user authentication performed by the CN succeeds, the CN may send the message carrying the packet forwarding manner to the wireless AP associated with the client device.

When the packet forwarding manner is a local forwarding manner, the message carrying the packet forwarding manner and sent by the sending unit 303 may further include the address of the client device; when the packet forwarding manner is a centralized forwarding manner, the massage carrying the packet forwarding manner and sent by the sending unit 303 may further carry a tunnel encapsulation and decapsulation parameter related to the client device. It should be noted that the tunnel encapsulation and decapsulation parameter related to the client device is generated by the CN. If the user attribute includes the address of the client device, or the wireless AP records a correspondence between the user attribute and the address of the client device after receiving the connection establishment request packet, the message carrying the packet forwarding manner and sent by the CN may not include the address of the client device.

After receiving the message carrying the packet forwarding manner, the wireless AP may create the forwarding entry of the client device, where the forwarding entry of the client device includes the packet forwarding manner of the client device, and also includes the address of the client device, so that after receiving a packet from the client device, the wireless AP can look up, according to the address in the packet, the forwarding entry that is of the client device and corresponding to the address of the client device, and acquire the packet forwarding manner corresponding to the address of the client device.

It should be noted that, when receiving the connection establishment request packet from the client device, the wireless AP may determine a correspondence between the address of the client device and user attribute according to the address in the request packet and the user attribute carried by the request packet. However, a common service packet may possibly include only the address of the client device but not the user account or the client device type, and therefore the address of the client device and the packet forwarding manner are included in the forwarding entry created in the wireless AP, so that the wireless AP forwards a received service packet correspondingly.

After the packet forwarding manner is configured, if the client device roams from one wireless AP to another wireless AP, this embodiment of the present invention can keep use of the original packet forwarding manner after roaming of the client device. The client device may roam between different wireless APs within one CN, or may roam between wireless APs in coverage of different CNs.

Preferably, the apparatus provided in this embodiment of the present invention further includes a determining unit 304.

When the client device roams from a first wireless AP of a second CN to a second wireless AP of the first CN, the determining unit 304 is configured to determine a second packet forwarding manner for a packet of the client device according to a first packet forwarding manner for the packet of the client device and a roaming policy, where the first packet forwarding manner is a forwarding manner used by the first wireless AP for the packet of the client device, and the second packet forwarding manner is a forwarding manner used by the second wireless AP for the packet of the client device.

The sending unit 303 is further configured to send the second packet forwarding manner to the second wireless AP to which the client device roams, so that the second wireless AP to which the client device roams creates a forwarding entry of the client device.

Optionally, the apparatus provided in this embodiment of the present invention further includes a storing unit 305 configured to store the pre-configured roaming policy, where the roaming policy is a policy used to determine a change of the packet forwarding manner when the client device roams between different wireless APs.

The roaming policy may be pre-configured in a CN. The roaming policy is a policy used to determine a change of a packet forwarding manner when the client device roams between different wireless APs.

It should be noted that, the roaming policy mentioned herein is not unchangeable and may be determined by each CN according to limitations imposed on some user attributes by the CN. For example, if a CN does not support use of a local forwarding manner for packets of some client device types (for example, smart phones), a roaming policy of the CN may be that, if a client device type of a client device roaming to the CN is intelligent terminal, a packet forwarding manner of the client device roaming to the CN can only be a centralized forwarding manner no matter whether a first packet forwarding manner is a local forwarding manner or a centralized forwarding manner; according to the roaming policy, if the client device type of the client device roaming to the CN is not intelligent terminal, a second packet forwarding manner for a packet of the client device roaming to the CN may be the same as the first packet forwarding manner before the roaming.

Therefore, this embodiment of the present invention implements that forwarding manners of different user types are controlled based on user attributes using one network, so that configuration and maintenance are easy; it is also implemented that, when a client device roams between different wireless APs, a forwarding manner can roam synchronously, where the packet forwarding manner of the client device is controlled based on a user attribute.

Figure 4:
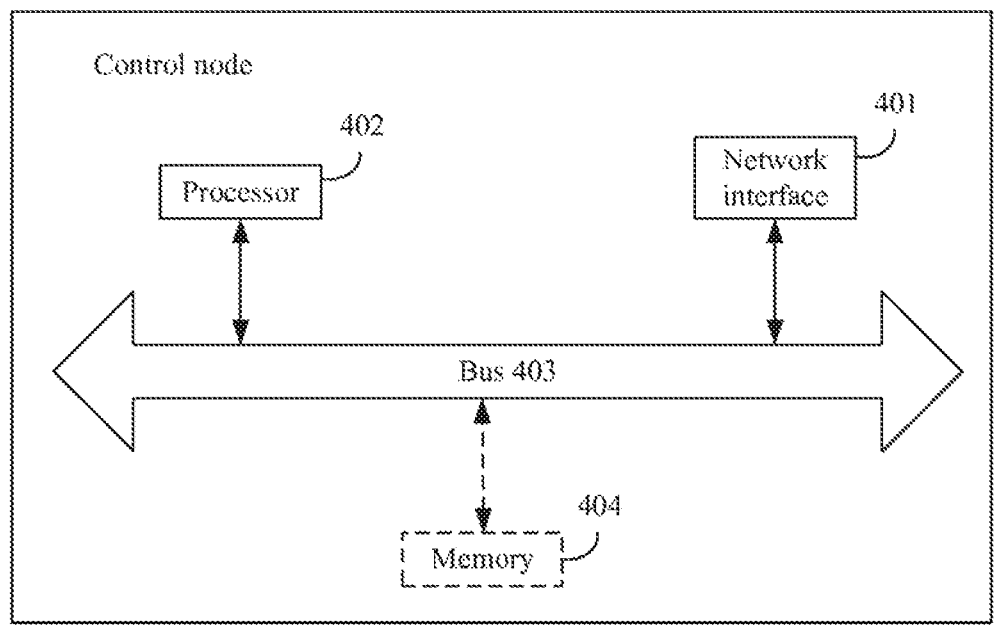
FIG. 4 is a schematic diagram of a CN according to an embodiment of the present invention.

Correspondingly, an embodiment of the present invention further provides a CN, and FIG. 4 is a schematic diagram of the CN according to this embodiment of the present invention. As shown in FIG. 4, the CN provided in this embodiment includes a network interface 401, a processor 402, and a bus 403, where the bus 403 is configured to connect the network interface 401 and the processor 402.

The network interface 401 may be one or more of the following: a network interface controller (NIC) that provides a wired interface, such as an Ethernet NIC, where the Ethernet NIC may provide a copper and/or fiber interface, and a NIC that provides a wireless interface, such as a WLAN NIC.

The processor 402 is a central processing unit (CPU), a network processor (NP), or a combination thereof. The processor 402 may further include a hardware chip. The foregoing hardware chip may be one or a combination of the following: an application-specific integrated circuit (ASIC), a field-programmable gate array (FPGA), and a complex programmable logic device (CPLD).

If the processor 402 is a CPU or a combination including a CPU, the CN further includes a memory 404 configured to store program code and transmit the program code to the CPU. The memory may include a volatile memory such as a random-access memory (RAM); the memory may also include a non-volatile memory such as a read-only memory (ROM), a flash memory, a hard disk drive (HDD), or a solid-state drive (SSD); the memory may further include a combination of the foregoing memories. The memory 404 is connected to the processor and the network interface using the bus 403.

The processor 402 executes the following steps: receiving a connection establishment request packet from a client device using the network interface 401, and acquiring a user attribute according to the request packet; acquiring, according to the user attribute and a forwarding policy that is stored in the CN or an authentication controller, a packet forwarding manner corresponding to the client device, where the forwarding policy includes a packet forwarding manner corresponding to the user attribute; and after authentication succeeds, sending, using the network interface 401, a message carrying the acquired packet forwarding manner to a wireless AP associated with the client device, so as to instruct the wireless AP to create a forwarding entry of the client device, where the forwarding entry includes the packet forwarding manner.

Further, when the packet forwarding manner is a local forwarding manner, the processor 402 may further send, using the network interface 401, an address of the client device to the wireless AP associated with the client device.

Further, when the packet forwarding manner is a centralized forwarding manner, the processor 402 may further send, using the network interface 401, a tunnel encapsulation and decapsulation parameter related to the client device to the wireless AP associated with the client device.

Further, when the client device roams from a first wireless AP of a second CN to a second wireless AP of the first CN, the processor 402 may execute the following instructions: determining a second packet forwarding manner for a packet of the client device according to a first packet forwarding manner for the packet of the client device and a roaming policy, where the first packet forwarding manner is a forwarding manner used by the first wireless AP for the packet of the client device, and the second packet forwarding manner is a forwarding manner used by the second wireless AP for the packet of the client device; and sending the second packet forwarding manner to the second wireless AP to which the client device roams, so that the second wireless AP to which the client device roams creates a forwarding entry of the client device.

Further, before the processor 402 determines the second packet forwarding manner for the packet of the client device, the processor 402 may further execute the following instruction: pre-configuring the roaming policy, where the roaming policy is a policy used to determine a change of the packet forwarding manner when the client device roams between different wireless APs.

Therefore, this embodiment of the present invention implements that forwarding manners of different user types are controlled based on user attributes using one network, so that configuration and maintenance are easy; it is also implemented that, when a client device roams between different wireless APs, a forwarding manner can roam synchronously, where the user packet forwarding manner of the client device is controlled based on a user attribute.

Persons of ordinary skill in the art may be further aware that, in combination with the examples described in the embodiments disclosed in this specification, units and algorithm steps may be implemented by hardware and computer software. The foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The method described with reference to the disclosed embodiments of this specification may use program code executed by a processor, where the program code may reside in a random access memory, a read-only memory, an electrically programmable ROM, an electrically erasable programmable ROM, a hard disk, or any other form of storage medium.

In the foregoing specific implementation manners, the objectives, technical solutions, and benefits of the present invention are further described in detail. It should be understood that the foregoing descriptions are merely specific implementation manners of the present invention, but are not intended to limit the protection scope of present invention. Any modification, equivalent replacement, or improvement made on the basis of the technical solutions of the present invention shall fall within the protection scope of the present invention.

The invention claimed is:

1. A method for configuring a packet forwarding manner, the method comprising:
   receiving, by a control node (CN), a connection establishment request packet from a client device;
   acquiring a user attribute according to the request packet;
   acquiring, by the CN, a packet forwarding manner for a first packet of the client device, according to the user attribute and a forwarding policy that is stored in the CN or an authentication controller, wherein the forwarding policy comprises the packet forwarding manner for the first packet of the client device corresponding to the user attribute;
   sending, by the CN, after authentication succeeds, a message carrying the packet forwarding manner for the first packet of the client device to a first wireless access point (AP) associated with the client device, so as to instruct the first wireless AP to create a forwarding entry of the client device, wherein the forwarding entry comprises the packet forwarding manner for the first packet of the client device;
   determining, by the CN, a packet forwarding manner for a second packet of the client device according to the packet forwarding manner for the first packet of the client device and a roaming policy when the client device roams from the first wireless AP to a second wireless AP; and
   sending, by the CN, the packet forwarding manner for the second packet of the client device to the second wireless AP, so as to instruct the second wireless AP to create a forwarding entry of the client device.

2. The method for configuring a packet forwarding manner according to claim 1, wherein, when the packet forwarding manner for the first packet of the client device is a local forwarding manner, the method further comprises sending the address of the client device to the first wireless AP associated with the client device.

3. The method for configuring a packet forwarding manner according to claim 1, wherein, when the packet forwarding manner for the first packet of the client device is a centralized forwarding manner, the method further comprises sending a tunnel encapsulation and decapsulation parameter related to the client device to the first wireless AP associated with the client device.

4. The method for configuring a packet forwarding manner according to claim 1, further comprising:
   pre-configuring the roaming policy, wherein a change of the packet forwarding manner for the second packet of the client device when the client device roams from the first wireless AP to the second wireless AP is determined according to the roaming policy.

5. A control node, comprising:
   a network interface;
   a processor; and
   a bus, wherein the bus is configured to connect the network interface and the processor, wherein the processor is configured to:
     receive, using the network interface, a connection establishment request packet from a client device;
     acquire a user attribute according to the request packet;
     acquire, according to the user attribute and a forwarding policy, a packet forwarding manner for a first packet of the client device, wherein the forwarding policy comprises the packet forwarding manner for the first packet of the client device corresponding to the user attribute; and send, using the network interface, after authentication succeeds, a message carrying the packet forwarding manner for the first packet of the client device to a first wireless access point (AP) associated with the client device, so as to instruct the first wireless AP to create a forwarding entry of the client device, wherein the forwarding entry comprises the packet forwarding manner for the first packet of the client device;

determine a packet forwarding manner for a second packet of the client device according to the packet forwarding manner for the first packet of the client device and a roaming policy when the client device roams from the first wireless AP to a second wireless AP;

send, using the network interface, the packet forwarding manner for the second packet of the client device to the second wireless AP, so as to instruct the second wireless AP to create a forwarding entry of the client device.

6. The control node according to claim 5, wherein, when the packet forwarding manner for the first packet of the client device is a local forwarding manner, the processor is further configured to send, using the network interface, the address of the client device to the first wireless AP associated with the client device.

7. The control node according to claim 5, wherein, when the packet forwarding manner for the first packet of the client device is a centralized forwarding manner, the processor is further configured to send, using the network interface, a tunnel encapsulation and decapsulation parameter related to the client device to the first wireless AP associated with the client device.

* * * * *